Jan. 12, 1932.  A. J. MUSSELMAN  1,841,336
INSULATING HUB FOR PROTECTING TIRES

Filed May 31, 1930

Inventor
Alvin J. Musselman

By Bee + Bush
Attorneys

Patented Jan. 12, 1932

1,841,336

UNITED STATES PATENT OFFICE

ALVIN J. MUSSELMAN, OF AKRON, OHIO, ASSIGNOR TO THE GOODYEAR TIRE & RUBBER COMPANY, OF AKRON, OHIO, A CORPORATION OF OHIO

INSULATING HUB FOR PROTECTING TIRES

Application filed May 31, 1930. Serial No. 457,736.

This invention relates to hub constructions for pneumatic wheels and it has particular relation to a construction for protecting pneumatic tires from heat generated by brakes employed in such pneumatic wheels.

One object of the invention is to provide a tire-engaging braking hub which provides effective insulation of the tire from the heat generated in the hub.

Another object of the invention is to provide a braking hub for supporting a pneumatic tire in close proximity thereto without subjecting the tire to excessive heat generated in the braking hub.

In operating airwheels having portions of relatively small diameters which are directly in contact with the hub of the wheel, considerable heat is generated in the hub by the brake mechanism mounted therein. In view of the desirability of maintaining all of the braking elements within the hub and within the lines of the wheel, a tire of the type under consideration must necessarily be disposed closely adjacent the braking surfaces.

According to this invention, a braking hub is provided with an intermediate cylindrical portion having a slightly smaller diameter than the end portions thereof. A cylindrical sleeve fitted over the end portions is spaced from the intermediate cylindrical portion of the hub, thus providing an air space which very effectively insulates the heat generated in the hub from the tire.

Figure 1:
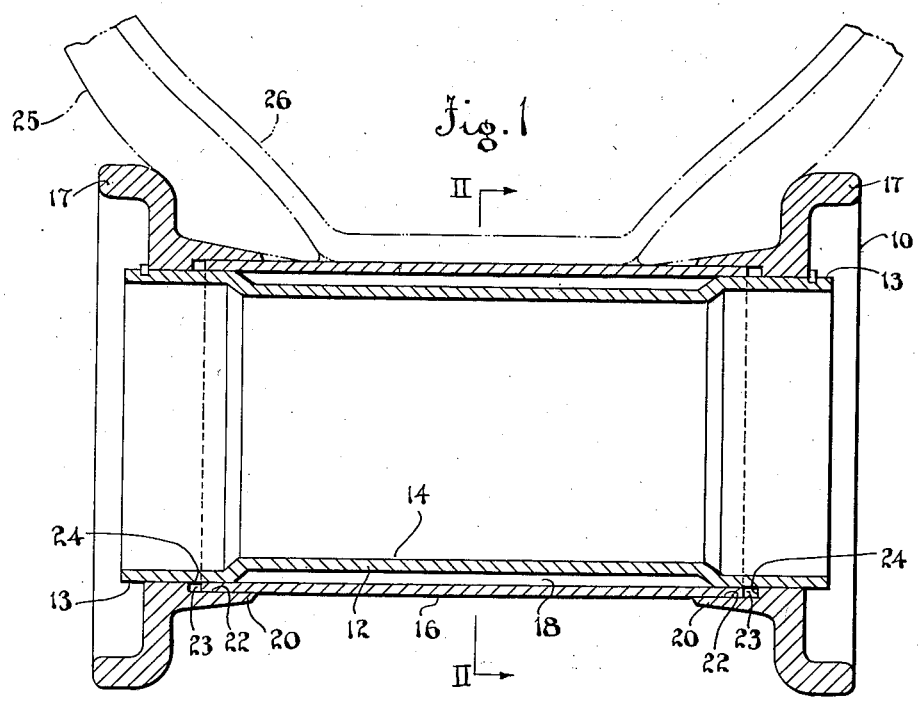
Figure 2:
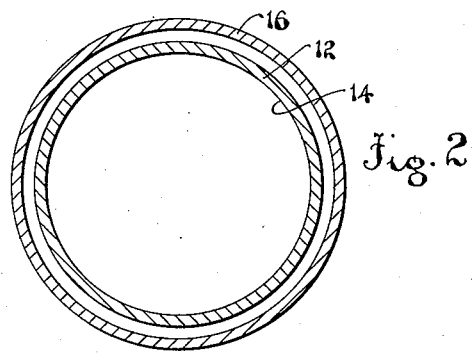

For a better understanding of the invention, reference may now be had to the drawings forming a part of the specification, of which Figure 1 is a longitudinal, sectional view of a hub constructed according to the invention, and Figure 2 is a cross-sectional view taken substantially along the lines II—II of Figure 1.

Referring to the drawings, the invention is applied to an airwheel hub 10 which comprises an intermediate cylindrical portion 12 of less diameter than its outer end portions 13. The intermediate cylindrical portion 12 comprises an internal braking surface 14. A sleeve 16 having its ends fitting relatively closely, but not so as to bind upon the end portions 13, is maintained in its proper position upon the hub by means of flanged tire-bead-supporting rings 17, which fit in like manner upon the end portions 13 of the hub and are removably mounted thereon. Both the sleeve 16 and the rings 17 are positioned upon the end portions by sliding them axially thereon. The rings 17 are secured firmly in the relation shown by Fig. 4. Preferably, the sleeve is composed of magnesium, aluminum or other light material. Thus an annular chamber or air space 18 is provided by the sleeve and the intermediate hub portion 12.

Each ring 17 is provided with an inwardly projecting flange 20 which has a cylindrical inner surface 22 embracing one end portion of the sleeve 16. In order to facilitate the mounting and dismounting of the rings with respect to the hub, spaces 23 are provided between shoulders 24 of the rings and the ends of the sleeve.

A pneumatic tire 25 and an inner tube 26 supported upon the hub 10 directly engage the sleeve 16 and are separated from the intermediate cylindrical portion 12 by the air space 18. Therefore, they are insulated from the heat generated about the braking surface 14. Although the ends of the sleeve 10 are not separated by an air space from the braking surface, there is considerable thickness through the hub, sleeve and ring at these locations, and the beads of the tire engaging the rings 17 are not subject as much to the deteriorating effects of the heat as the relatively thin inner tube 26 which is more directly insulated.

Although I have described and illustrated only the preferred form which the invention may assume, it will be apparent to those skilled in the art that the invention is not so limited but that various minor modifications may be made therein without departing from the spirit of the invention or from the scope of the appended claims.

What I claim is:

1. A tire-supporting cylindrical hub barrel comprising an inner cylindrical braking surface, bead-supporting flanged rings mounted upon the end portions of the hub barrel, a sleeve closely embracing the end portions of the hub barrel, said rings overlapping the end portions of the sleeve in such manner as to provide a space between the ends of the sleeves and the rings, the intermediate portions of the hub barrel and sleeve being spaced to provide an annular air space for insulating the braking cylinder from the tire.

2. In combination, a hub barrel having a wide annular depressed channel portion the inner periphery of said channel portion comprising a braking surface, a sleeve secured on the hub barrel and bridging the annular channel portion whereby a dead air insulating pocket is formed between the internal braking surface and the sleeve, a tire and tube mounted on the sleeve, and tire retaining flanges removably mounted on the ends of the hub barrel.

In witness whereof, I have hereunto signed my name.

Signed at Akron, in the county of Summit and State of Ohio, U. S. A., this 26th day of May, 1930.

ALVIN J. MUSSELMAN.